United States Patent [19]

Lain

[11] 4,256,221
[45] Mar. 17, 1981

[54] WORKPIECE ASSEMBLY MACHINERY

[75] Inventor: Ronald G. Lain, Bay City, Mich.

[73] Assignee: RWC, Inc., Bay City, Mich.

[21] Appl. No.: 79,097

[22] Filed: Sep. 26, 1979

[51] Int. Cl.$^3$ .................. B65G 47/31; B65G 15/64; B65G 37/00
[52] U.S. Cl. .................................. 198/345; 198/461; 198/472
[58] Field of Search ............... 198/472, 345, 459, 461, 198/580, 648, 491

[56] References Cited

U.S. PATENT DOCUMENTS

| | | | |
|---|---|---|---|
| 3,070,838 | 1/1963 | Hostettler | 198/472 |
| 3,072,095 | 1/1963 | Keessen et al. | 198/345 |
| 3,452,855 | 7/1969 | Baker et al. | 198/461 |
| 3,738,478 | 6/1973 | Tourtellotte | 198/472 |
| 3,934,701 | 1/1976 | Mooney et al. | 198/472 |
| 4,062,444 | 12/1977 | Nakou et al. | 198/648 |

Primary Examiner—Bruce H. Stoner, Jr.
Assistant Examiner—Brian Bond
Attorney, Agent, or Firm—Learman & McCulloch

[57] ABSTRACT

A conveyor line moves palleted workpieces past a plurality of work stations arranged at intervals along the line. The pallets to which the workpieces are clamped are frictionally supported for travel at a designated linear rate of speed. A portion of the conveyor line adjacent one or more work stations includes a conveyor for spaced apart pallet control elements, which are driven at a reduced rate of speed. The traveling pallet control elements on the second conveyor prevent the pallets from moving at the faster rate of the first conveyor. A stop element, which is normally maintained in the path of pallets on the first conveyor but moves out of the plane of movement of the pallets to release the pallets individually is operated when a pallet control element on the second conveyor reaches a predetermined position. The relative speed of these conveyors, the position of the stop element, and the spacing of the pallet control elements, is such that there is time before the release of a subsequent pallet for an assembler or operator to grasp and temporarily halt travel of a pallet to complete an operation before permitting it to resume its travel. When the second conveyor control elements finally release the pallets to travel at the speed of the first conveyor, they are in a predetermined, spaced apart relationship.

4 Claims, 5 Drawing Figures

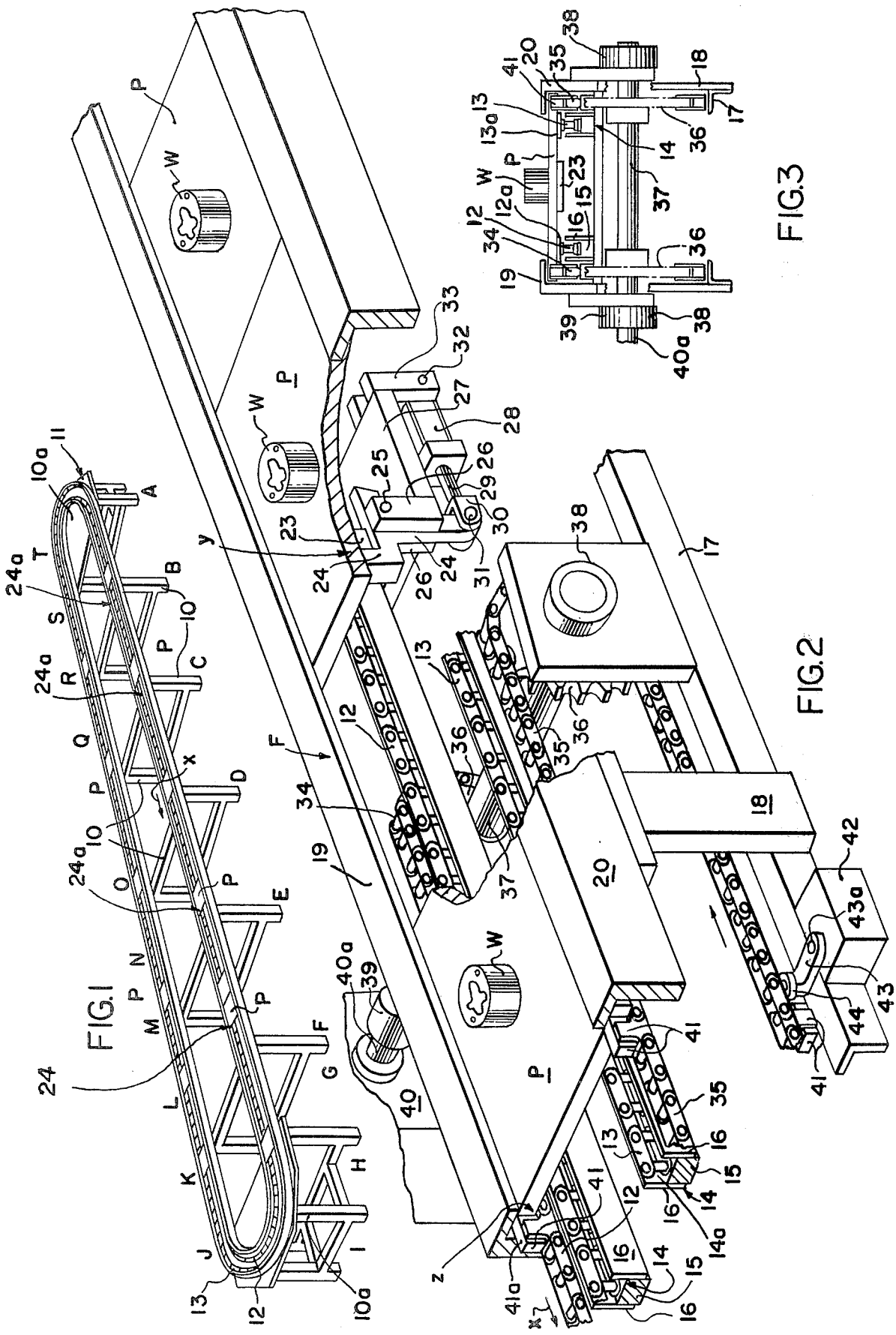

WORKPIECE ASSEMBLY MACHINERY

BACKGROUND OF THE INVENTION

Typical workpiece assembly machines move parts clamped to pallets around a continuous loop past a variety of work and assembly stations and frequently are of the stop and go type wherein an operator releases a dog, which has been holding the pallet in indexed position while he is working on the part, when he is finished working on the workpiece. Such systems use considerable time, and one of the prime objects of the present invention is to provide a system wherein a portion of the length of the conveyor line, at least, can move continuously past a number of stations while assembly operations are being performed on the slowly moving workpieces.

The system which has been proposed permits an assembler at a work station to manually hold back a pallet for a period of time in order to complete an assembly operation that was inadvertently delayed, while at the same time saving considerable time over the stop and go method. The system operates such that, upon the operator's releasing such a pallet, the pallet again rapidly respaces itself with relation to the pallet immediately ahead and continues on to the next operator.

Another important advantage of the present system from a time and motion standpoint, is the fact that it tends to "pace" the operators at the various stations along the length of the section in which manual and automatic operations are being performed at various stations while the pallets are moving.

SUMMARY OF THE INVENTION

In the environment of a workpiece assembly machine having a plurality of spaced apart work stations arranged along conveyor line for frictionally carrying palleted parts, and wherein there is a first conveyor on which the pallets are frictionally supported for travel at a predetermined linear rate of speed, a traveling control moves at a reduced rate of speed in co-parallel alignment with the first conveyor. An activator operates to initially stop a pallet traveling frictionally on the first conveyor, and releases the pallets individually synchronously with the travel of the traveling control. There is time, before the release of a subsequent pallet, for an operator to manually grasp and temporarily halt travel of a pallet to complete an operation, if it is necessary to do this.

Other objects and advantages of the invention will be pointed out specifically or will become apparent from the following description when it is considered in conjunction with the appended claims and the accompanying drawings, wherein:

FIG. 1 is a schematic, perspective elevational view of a typical workpiece assembly machine incorporating the inventive apparatus;

FIG. 2 is an enlarged, fragmentary perspective view showing certain of the operating elements thereof;

FIG. 3 is a fragmentary end elevational view thereof illustrating the manner in which the traveling control mounting chains are driven;

Figure 4:
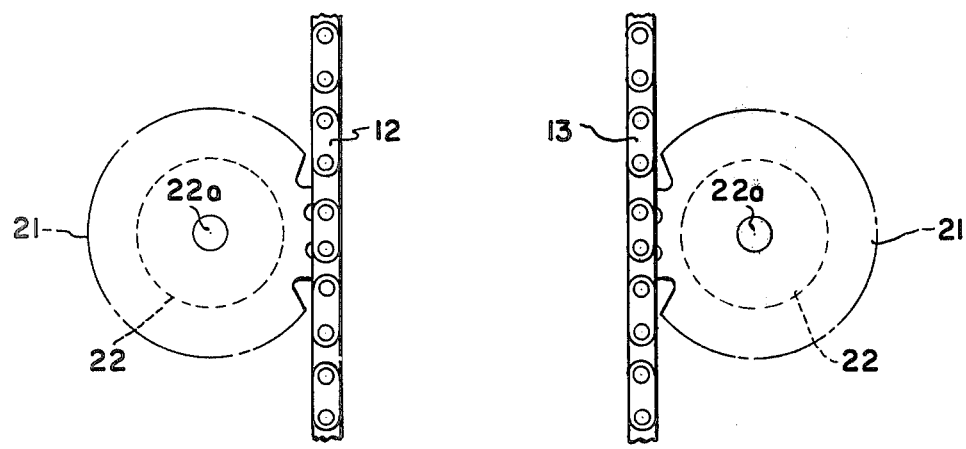
FIG. 4 is a fragmentary top plan view illustrating a manner in which the drive chains may be driven.

Referring now more particularly to the accompanying drawings, and in the first instance to FIG. 1, the letters A through T represent a number of workpiece assembly stations which are provided at intervals along the length of the conveyor loop which is shown. If the direction of movement of the pallets P with typical work pieces W clamped in position thereon, is in the direction x, then workpieces may be loaded at station A and unloaded at station T, with machining, assembly, and test operations being performed by operators at stations B through S.

Normally, of course, a great many work stations are provided along the length of the carousel which in terms of length may be quite long. An overhead basket conveyor (not shown), containing parts to be assembled, may move along at the speed of travel of the products at stations G and F, for example, to furnish a supply of parts which can be used in assembly operations. This overhead basket line can be synchronized with the pallet conveyor devices.

Only two stations G and F are shown along the portion of the line which will now be more particularly described. It is to be understood that this is for the sake of simplicity only, and five or more stations may be employed if desired. For purposes of simplicity, it will be assumed that stations A–E and H–T are manually controlled start and stop stations, where the pallets P are stopped while the operator works on them. At the stations G and F, in contrast, each workpiece supporting pallet P will normally be moving along while the work is being performed.

In the schematic representation which is illustrated in FIG. 1, a series of connected frames 10, bounded by end table supports 10a, are provided in longitudinally spaced relation to support an endless conveyor loop, generally designated 11. The endless loop assembly 11 is made up of a pair of endless drive chains 12 and 13 travelling in guide grooves 14a provided in endless guides 14. The guides 14 each include a base 15 and upstanding guide walls 16.

At stations G and F, a frame support 17, connecting frames 10, has upstanding supports 18 for angle-shaped pallet guides 19 and 20. Outboard sprockets 21 driven by electric drive motor-speed reducer assemblies 22 (see schematic, fragmentary view, FIG. 4) may be provided to drive the chains 12 and 13 at a relative high linear speed, typically in the neighborhood of sixty feet per minute. The assemblies 22 typically have output shafts 22a on which drive sprockets 21 are rigidly keyed.

As FIG. 2 indicates, each pallet P has a dependent stop bar 23, provided on its under surface in a predetermined, fixed position, and as each pallet P approaches the work station F, an angular bell crank stop element 24 is initially in position to engage it and halt the travel of pallet P in the first instance. The stop 24 is pivotally mounted as at 25 to a pair of upstanding clevis bars 26, fixed to a plate 27 mounted fixedly on the machine frame. Lever 24 can be swung down by a fluid pressure operated control cylinder 28, having a piston rod 29 fitted at its outboard end with a clevis 30, which is pinned as at 31 to the lower end of bell crank 24. Control cylinder 28 is preferably a conventional single acting, spring returned, solenoid operated, air cylinder, which under the operation of the return spring, extends piston 29 to the position shown in FIG. 2 in which stop 24 is in operative position at position y, preventing the forward travel of the pallet P. Cylinder 28 at its opposite end may be pinned as at 32, to the bars 33 which fix to plate 27.

Provided downstream from the stop 24 are a pair of pallet control mounting chains 34 and 35, outboard of the chains 12 and 13. The chains 34 and 35 are driven by sprockets 36, fixed on a shaft 37 journaled by bearings 38. Shaft 37 may be coupled as at 39 to the output shaft 40a of a second electric drive motor-gear reducer assembly 40. The link chains 34 and 35 are mounted slightly below the level of chains 12 and 13, and accordingly the level of travel of pallets P. At predetermined intervals, the chains 34 and 35 are provided with special dog links 41 which mount blocks 41a, which function as pallet controls. The chains 34 and 35 are driven at a relatively slower speed, i.e., twenty linear feet per minute, and pallets P, released by the stop 24, will be moved at a faster rate of speed by chains 12 and 13 initially, but once contact is made with the dogs 41, can travel no faster than permitted by the dogs 41.

Figure 5:
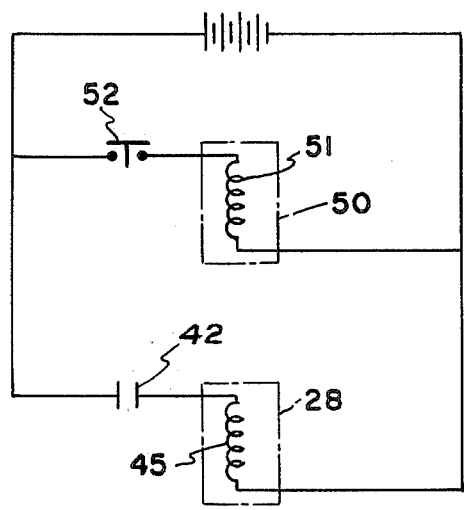
FIG. 5 depicts a schematic electrical control circuit which may be used.

A normally open limit switch 42, having a pivotally mounted operating arm 43, with a roller 44 in the path of movement of dogs 41, at one side of the machine, is provided to energize the valve operating solenoid 45 (see FIG. 5) of cylinder 28. When the dog 41 strikes roller 44, and pivots spring returned arm 43 about pivot 43a out of its path, the cylinder 28 is activated to pivot bell crank stop 24 about pin 25 and release the next pallet P to proceed forwardly. It is to be understood that stops 24a similar to stop 24 typically are provided in the other stations A-E and H-T. As illustrated in FIG. 5, where only one operating cylinder is illustrated for the sake of simplicity, these stops are similarly released by fluid pressure operated cylinders 50, having valve actuating solenoids 51, by the operator pressing a button 52 or the like.

In operation, the drive chains 12 and 13 initially move a pallet P from a position remote from stop 24, to a position in which bar 23 is in abutment with the stop 24, and the pallet P is halted in position momentarily. When limit switch 42 is activated to cause cylinder 28 to retract and pivot stop lever 24 downward, the relatively high speed of chains 12 and 13 quickly moves the released pallet P to a position above the slower chains 34 and 35, which are traveling at a working rather than a work station transfer speed, and on to a position in which it engages the lugs 41 traveling with the upper run of chains 34 and 35, as for instance at position z. At this point the pallet P travels no faster than the "pacer" chains 34 and 35, and there is a certain slippage of drive chains 12 and 13 relative to pallets P, because the drive chains 12 and 13 are moving at the faster rate of speed. Wear pads 12a and 13a can be provided on pallets P as shown in FIG. 4.

The slow rate of conveyance at stations F and G makes it possible for the operator to "pace" himself for a particular operation and, if he needs to grasp the pallet P and hold it temporarily to complete an operation, he can do so. The position of stop 24, the spacing between sets of lugs 41, and the relative speeds of friction conveyor chains 12-13 and control chains 34-35 are such as permit him an opportunity to do this. Of course, when a worker does stop one of the pallets P in this manner, and then releases it, it again rapidly respaces itself due to the driving influence of chains 12 and 13, which move it forwardly rapidly until it again engages the lugs 41 on chains 34 and 35. Because each pallet P is stopped in the first place by stop 24, the system is synchronized, and the system has the capability of controlling both the speed and the spacing of the pallets P as they transfer through this length of the pallet transfer system.

Typically the pacer chains 34 and 35 will be driven at about one-third the speed of the driving chains 12 and 13. Each of the chain links 12 and 13 is formed of hardened material, so that it will not wear appreciably with the friction created, and each set of chains will be driven by its own independent drive unit, normally a standard AC electric motor and reducer assembly. At each end of the loop, the drive chains 12 and 13 will be tensioned in the normal manner. As many pallets P as necessary can be provided in the system, and, for instance, one hundred or more typically may be used. Products such as pumps can be assembled readily and the schematic representation of the workpiece W may be understood to be a representation of a housing. Suitable clamps (not shown) are provided, of course, to clamp the housing to the pallet P so that various machining, assembling, and inspection operations can be performed at the various stations. Of course, when the pallets P are conveyed beyond the chains 34 and 35, they resume their higher linear rate of travel, and proceed in properly spaced relation.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. In a workpiece assembly machine having a plurality of work stations arranged at intervals therealong; a conveyor line for moving parts on pallets intermittently along the conveyor line; there being pallet stops provided at various stations under the control of the operators to halt a pallet at the station while an operation is being performed thereon; said line having a generally horizontal first conveyor run portion on which said pallets are frictionally supported for travel at a predetermined linear rate of speed; means for driving said run portion; a second conveyor interjacent the ends of the conveyor line mounting spaced apart pallet control elements for travel in a path extending co-parallelly with and adjacent said first run portion, and of a length to extend along only a part of the first conveyor run portion; means for driving the second conveyor at reduced speed; said pallet control elements being provided on said second conveyor to project therefrom into the path of pallets frictionally carried on the first conveyor and prevent the pallets from moving at the faster rate of travel thereof before releasing them to travel at the speed of the first conveyor run portion again; a stop element movable into and out of the plane of movement of pallets on said faster moving first conveyor run portion to normally impede a pallet frictionally carried thereon; a control provided to release said stop element and pass a single pallet to travel; an activator provided to operate said control when a pallet control element on the second conveyor reaches a predetermined position; and said pallet control elements on the second conveyor being spaced apart relative to their speed of travel, the speed of travel of the first conveyor, and the position of said stop element such that there is time before the release of a subsequent pallet for an assembler to grasp and temporarily halt travel of a pallet before permitting it to assume its travel.

2. The machine of claim 1 in which said pallets have stop bars depending therefrom; said stop element comprises abutment means which move vertically up into a position to block the forward travel of said stop bars, fluid pressure operated cylinder means comprise the control to move said abutment means down from blocking position and automatically return same to up position, and switch means is the activator provided to sense the position of an on-coming pallet control element on the second conveyor run and operate the control.

3. In a workpiece assembly machine having a plurality of work stations arranged at intervals therealong; a conveyor line for moving parts on pallets intermittently along the conveyor line; said line having a generally horizontal first conveyor run portion on which said pallets are frictionally supported for travel at a predetermined linear rate of speed; means for driving said run portion; a second conveyor interjacent the ends of the conveyor line and moving at a level below the first conveyor run portion mounting pallet control elements for travel in a path extending co-parallelly with said first conveyor run portion; the second conveyor having an entrance end and an exit end relative to said first conveyor run portion; means for driving the second conveyor at a reduced speed relative to said first conveyor run portion; said pallet control elements being provided on said second conveyor to project therefrom into the path of pallets frictionally carried on the first conveyor and prevent the pallets from moving at the faster rate of travel thereof; a pallet spacer movable into and out of the plane of movement of pallets on said faster moving first conveyor run portion at the entrance end of the second conveyor to normally impede a pallet frictionally carried on the first conveyor run; and means controlling the pallet spacer to release pallets individually while holding subsequent pallets from proceeding at the second conveyor in synchronism with the position of the traveling pallet control elements.

4. The machine of claim 3 wherein the means for driving the first conveyor run drives it at about three times the speed at which the second conveyor is driven.

* * * * *